(12) United States Patent
Estrada et al.

(10) Patent No.: US 12,116,150 B2
(45) Date of Patent: Oct. 15, 2024

(54) DRONE FISHING SYSTEM FOR MULTIPLE FISHING LINES

(71) Applicant: Cerberus Fishing Systems Inc., Pembroke Pines, FL (US)

(72) Inventors: Anthony S. Estrada, Pembroke Pines, FL (US); Robert Vogt, IV, Ann Arbor, MI (US)

(73) Assignee: Cerberus Fishing Systems Inc., Pembroke Pines, FL (US)

( * ) Notice: Subject to any disclaimer, the term of this patent is extended or adjusted under 35 U.S.C. 154(b) by 0 days.

(21) Appl. No.: 17/958,823

(22) Filed: Oct. 3, 2022

(65) Prior Publication Data

US 2023/0192328 A1   Jun. 22, 2023

Related U.S. Application Data

(60) Provisional application No. 63/240,957, filed on Sep. 5, 2021.

(51) Int. Cl.
| | |
|---|---|
| *B64U 10/60* | (2023.01) |
| *A01K 99/00* | (2006.01) |
| *B64U 50/30* | (2023.01) |
| *B64U 70/93* | (2023.01) |
| *B64U 101/05* | (2023.01) |

(52) U.S. Cl.
CPC .............. *B64U 10/60* (2023.01); *A01K 99/00* (2013.01); *B64U 50/30* (2023.01); *B64U 70/93* (2023.01); *B64U 2101/05* (2023.01)

(58) Field of Classification Search
CPC ...... B64C 39/024; B64U 10/60; B64U 50/30; B64U 70/93; B64U 2101/05; A01K 99/00
See application file for complete search history.

(56) References Cited

U.S. PATENT DOCUMENTS

| | | | |
|---|---|---|---|
| 2022/0301302 A1* | 9/2022 | Murphy | G05D 1/0044 |
| 2023/0046127 A1* | 2/2023 | Guerra Johansson | H04N 7/183 |

* cited by examiner

*Primary Examiner* — Richard G Davis
(74) *Attorney, Agent, or Firm* — Kevin H. Fortin, Esq.

(57) ABSTRACT

A drone fishing system mountable on a fishing vessel having an aft portion includes a landing pad mounted having a drone station mounted on the aft portion of the fishing vessel, an unmanned aerial vehicle (UAV), and tether line and tether reel for maintaining an electrical connection between the drone station and the UAV. The UAV including a computing module for determining optimal positioning of the UAV with respect to the fishing vessel during operation. The UAV tether line spools about the tether reel and has an abrasion resistant cable jacket for enabling a selective engagement of a clip on the tether line. A first altimeter mounted on the fishing vessel. A second altimeter mounted on the UAV. The first and second altimeters communicate with the computing module of the UAV. The electrical connection communicates power and data between the landing pad and the UAV.

20 Claims, 5 Drawing Sheets

DRONE FISHING SYSTEM FOR MULTIPLE FISHING LINES

RELATED APPLICATION AND PRIORITY CLAIM

This patent application claims the benefit of U.S. Provisional Patent Application No. 63/240,957, filed on Sep. 5, 2021, the disclosure of which is incorporated herein by reference. This patent application also relates in subject matter to commonly assigned U.S. patent application Ser. No. 17/340,360, filed 7 Jun. 2021, the disclosure of which is incorporated herein by reference.

FIELD OF THE INVENTION

This invention relates to drone fishing systems, and particularly to drone fishing systems including releasable fishing lines.

BACKGROUND OF THE INVENTION

Kite fishing is said to have evolved in the Pacific Islands near New Guinea many generations ago. It enables beach surf anglers to deploy lines and hooks past breakers, so that the breakers will not interfere with the hook and rigging.

Kite fishing has also been adapted to anglers using fishing vessels. Lines can be deployed at a distance from the fishing vessel. Heavier test lines and rigs can be used in a hanging orientation, which deploys less line, can keep bait near the surface in a closely regulated depth. Some believe that deploying less line, and orienting the fishing line 18 in a more vertical angle, help assure success while fishing.

FIG. 1 shows a prior art Kite fishing arrangement including a fishing vessel 110, a kite line 112, a kite 114, a fishing rod 116, and a fishing line 118 with a depth marker 122 and bait 120. The kite line 112 includes at least one swivel such as a #5 or #7 swivel to prevent the kite line from twisting. Preferably, the kite line is 20-50 lb rated tensile strength polyethylene terephthalate line, (e.g. Dacron™ manufactured by DuPont de Nemours, Inc.) or equivalent.

A Goldfinger Clip 124 hangs the fishing line 118 on the kite line 112 and releases the fishing line 118 when the bait 120 is hit and taken by a fish 126, or snag. The Goldfinger clip 124 is shown in FIG. 2 along with a kite line 112 threaded axially through the Goldfinger clip 124. Fishing line 18 is supported by a portion of the clip 124 that releases the line 118 when the line tenses due to a hit or snag.

Some have said that kite fishing offers several advantages for those that like to use live bait for fishing. Kite fishing can closely regulate the depth of a baited fishing hook, and can distance the bait from a noisy and turbulent fishing vessel. Multiple fishing lines can be utilized simultaneously from a single kite under some circumstances. Drawbacks of Kite fishing is that downtime is achieved when the multiple fishing lines are tangled either before or after a fish hits the bait. This is because kites are inherently difficult to precisely maneuver in a variety of ambient conditions. For example, when the airflow needed to keep the kite in the air is solely provided by movement of the fishing vessel, and the fishing vessel stops to reel in a fish, the kite may need to be retracted, and re-deployed, reducing the time that bait is in the water.

U.S. Patent Publication No. US20160200437 to Ryan et al. Uses a tether line and winch to control position of a working drone device. The winch has an additional high speed motor and a drag lever to retrieve substantially all of the slack in the tether line faster than that winch alone. This reduces the problem of having slack in the tether line.

International Patent Publication WO2017147188A1 to Culver discloses a drone (UAV), a portable power source, and a tether connecting the UAV to a portable power source. The tether may transmit power from the portable power source to the UAV. The UAS may be controlled by a remote control, which may command the UAV to surveil a location and transmit images back to the controller. The UAV may further include one or more components attached to the UAV, such as a camera, surveillance equipment, a Taser®, a LED strobe light, laser, or a claw. A remote control may control the flight of the UAV as well as the functionality of the one or more components.

International Publication No. WO201805819A1 to Maclean et al discloses a line release assembly and connecting mechanism for use with a drone. The device includes a pair of opposed clamps that releasably hold a line when tension in the line exceeds a pre-set amount. FIG. 5 of Maclean et al shows the device directly enables a fishing line to be held and managed from a drone using the device. This device suffers from several drawbacks, however, including weight, and the inability to be used with multiple lines efficiently and effectively.

U.S. Pat. No. 10,427,789 to Gan discloses a drone system for spotting fish from above and deploying a fishing line. While this is a useful device, it would be difficult to be used with multiple lines without the risk for entanglement.

What is desired is a way of using a drone for fishing which can handle multiple fishing lines without risking entanglement, even when one line has hooked a fish.

SUMMARY OF THE INVENTION

A drone fishing system mountable on a fishing vessel having an aft portion. The system includes a landing pad mounted on the aft portion of the fishing vessel, the landing pad is an enclosure for storing a drone, i.e an unmanned aerial vehicle (UAV). The landing pad includes electrical connectors for communicating electricity (for example DC at 25 volts) from the fishing vessel to the drone, or from a battery pack to the drone. The landing pad also includes an electrically powered tether cable reel for managing tension and managing a UAV tether line. The landing pad may also include an inverter, or voltage regulator, and appropriate hardware for communicating system details to a computing module in the UAV or elsewhere.

The UAV includes a computing module for determining optimal positioning of the UAV with respect to the fishing vessel during operation.

The UAV tether line has several conductors individually sealed, and is surrounded by an abrasion resistant cable jacket for enabling a selective engagement of a clip on the tether line. The cable jacket and its several conductors cooperate to provide structural rigidity necessary for a UAV to carry numerous fishing lines attached to the tether line by clips.

The system includes a first altimeter mounted on the fishing vessel, and a second altimeter mounted on the UAV, the altimeters communicate with the computing module of the UAV and with each other to assure that the UAV maintains a desired altitude with respect to the aft portion of the vessel. The system further includes a load cell attached between the UAV and the tether line, or on the tether line adjacent the UAV to detect tension in the tether line. The tension of the tether line is typically held consistent by the tether line reel on the landing pad, but tension can rapidly change due to wind gusts and when a fish hits and takes a bait. Thus the tension of the tether line is important to determine so that the computing module can regulate power to the UAV in response to any spike of tension detected by the load cell.

The UAV further includes a remote control module for detecting signals and adjusting pitch, yaw, roll, power altitude, and thus, position with respect to the vessel. The remote control module communicates with the computing module. The UAV can be controlled via wire, or wireless communication. In instances where the bait position (i.e. depth or lateral placement) must be adjusted, the UAV can rapidly assist, or manage bait placement.

The electrical connection between the landing pad and the UAV communicates power and data between the landing pad and the UAV.

It can be appreciated that although two UAV devices are shown, that the present invention can include a multitude of such vehicles to manage a tether line with a multitude of fishing lines. It can also be appreciated that the present invention can be used with multiple line clips that release fishing line in response to tension in the fishing line.

DETAILED DESCRIPTION

Figure 1:
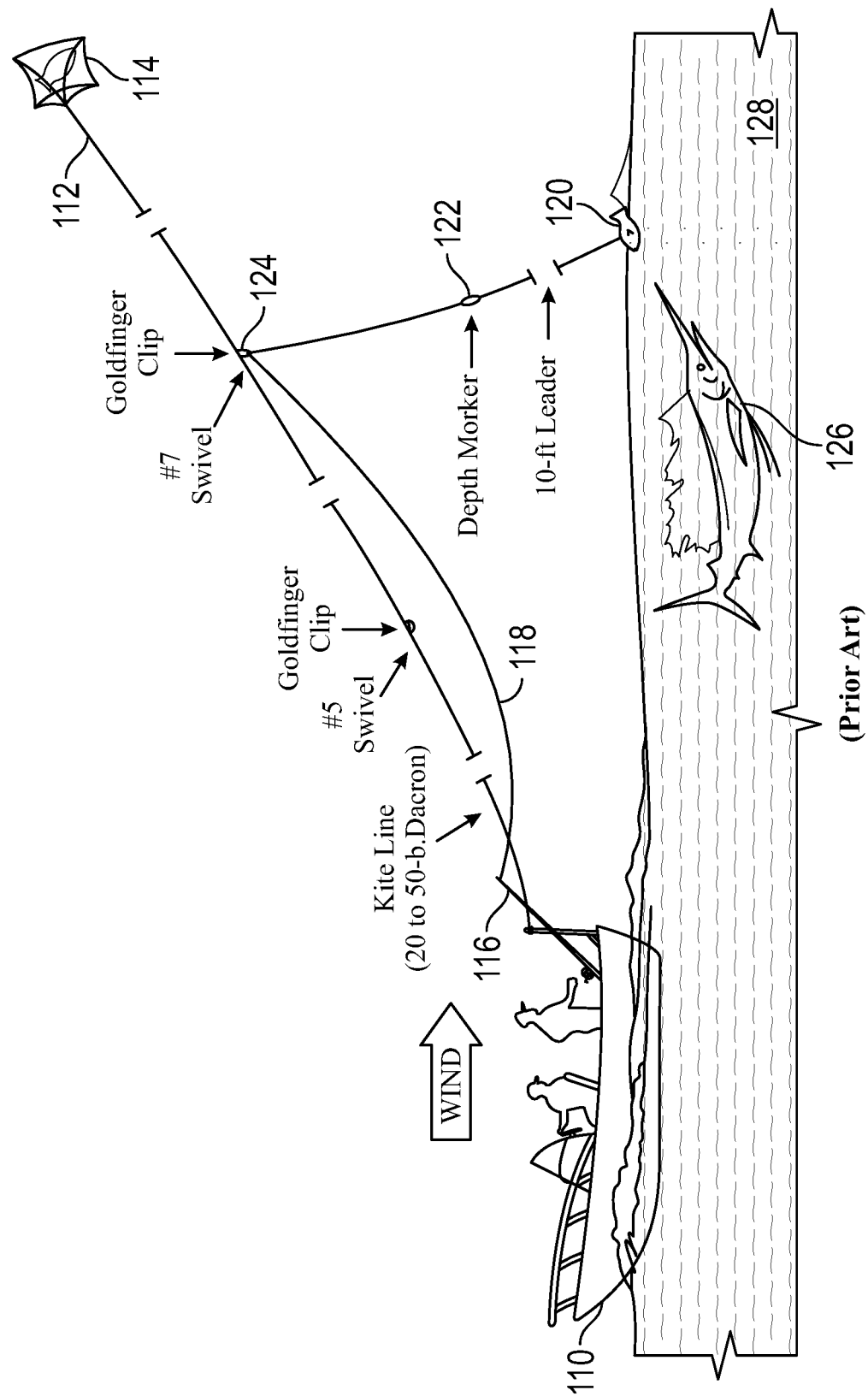
FIG. 1 is a prior art kite fishing scene using a Goldfinger Clip on a kite line.
Figure 2:
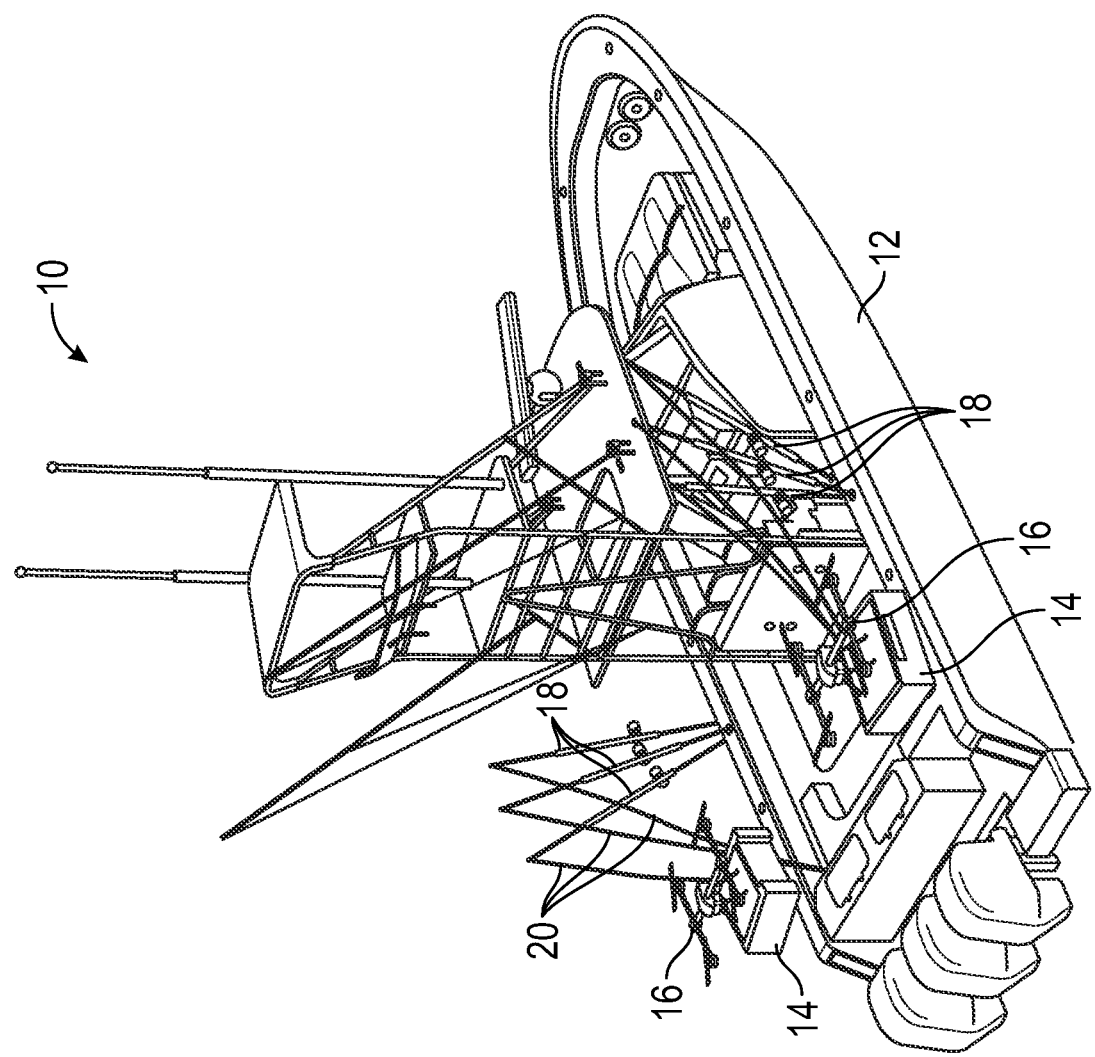
FIG. 2 is a perspective view a fishing vessel with two drones on landing pads at the aft starboard and aft port side, respectively, of the fishing vessel.

FIG. 2 is a drone fishing system in accordance with the present invention generally designated with the reference numeral 10. The drone fishing system 10 includes a fishing vessel 12, two landing pads 14, two unmanned aerial vehicles 16 (UAV's or drones) atop each respective landing pad 14. The fishing vessel 12 includes sets of fishing poles 18 removably mounted on the sides of the fishing vessel 12. Each fishing pole 18 has a fishing line 20 that is carried by a UAV. It can be appreciated that fishing line 20 includes a baited hook, not shown for luring or catching fish.

Figure 3:
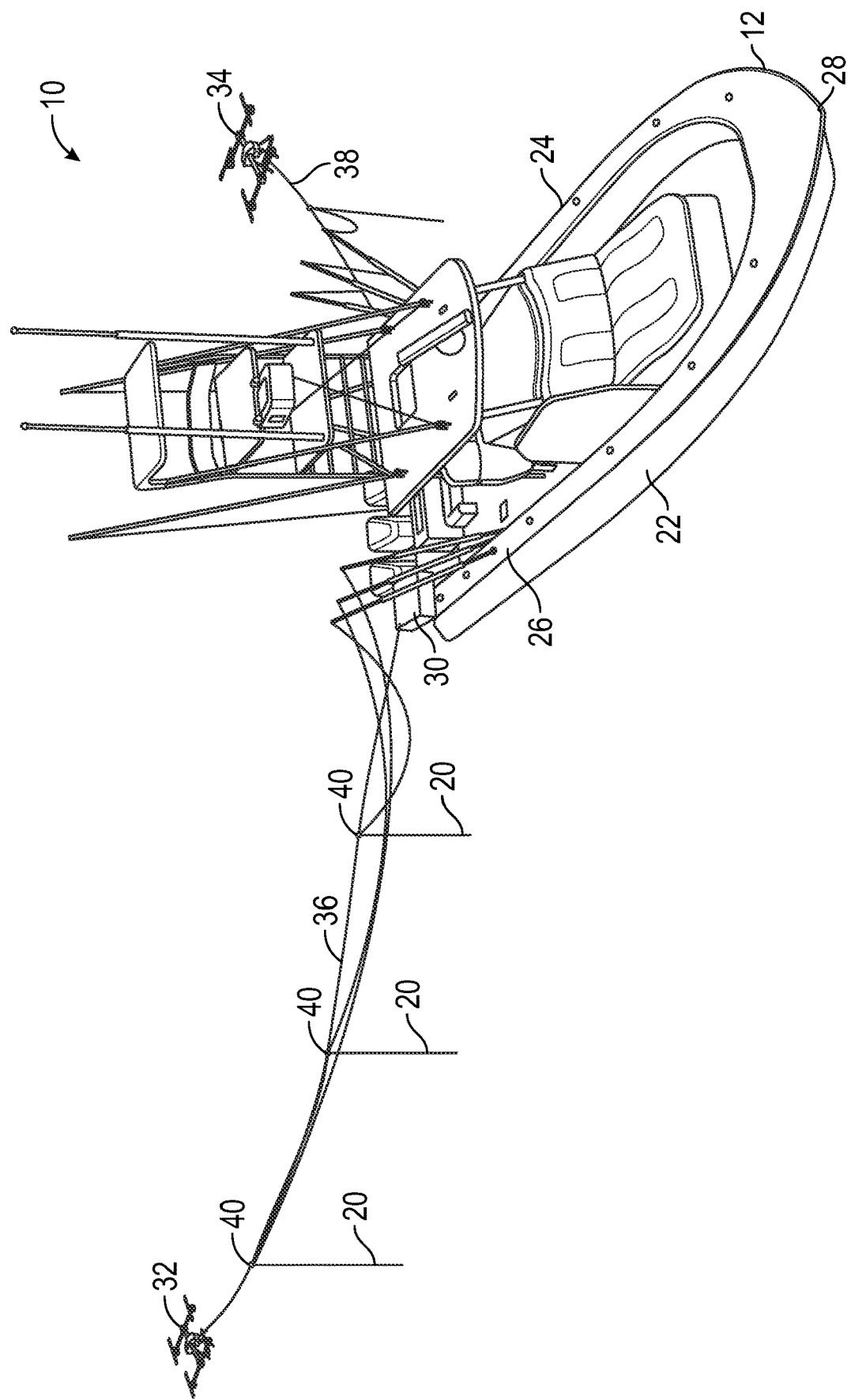
FIG. 3 is a perspective view a fishing vessel having one drone partially deployed and the other in the process of deployment.

FIG. 3 shows the drone fishing system 10 and the fishing vessel 12. The fishing vessel 12 includes a bow 28, a stern 30, a starboard side 22 and a port side 24. The aft portion 26 generally encompassing the stern and other regions of the vessel 12. The The UAV 32 carries fishing lines 20 from the fishing poles on a drone tether line 36. The drone tether line 36 connects to a tension reel enclosed by the landing pad 30. The UAV 34 is connected to the fishing vessel 12 via the tether line 38, preferably via a respective landing pad (not shown).

A clasp 40 supports each fishing line 20 on the tether line 36. The clasps 40 remain axially affixed upon the tether line to fix a distance between fishing lines, but allow the fishing lines 20 to translate freely through the clasp. The clasps 40 are such as clasps disclosed in Appendix A, attached hereto.

Figure 4:
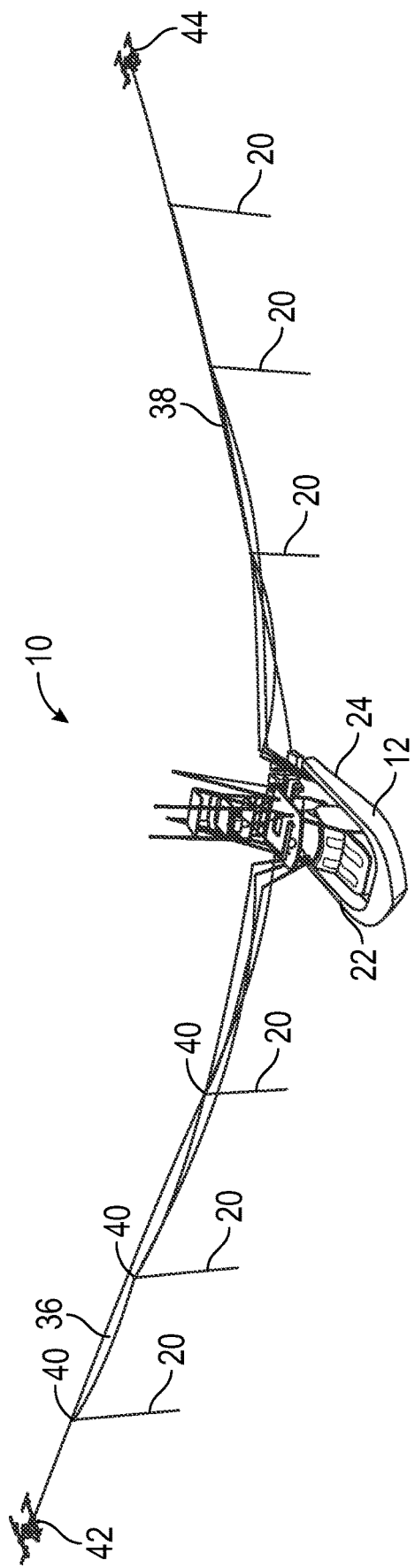
FIG. 4 is a perspective view a fishing vessel with a pair of drones and multiple fishing lines deployed.

FIG. 4 is a perspective view of the drone fishing system 10. The vessel 12 is shown with the UAVs 42 and 44 fully deployed from the starboard 22 and port 24 sides of the vessel 12, respectively.

UAV 44 pulls UAV tether line 36 at constant tension from the vessel 12. UAV 44 pulls the UAV tether line 36 at the same constant tension, or a different constant tension depending on the number and type of fishing lines managed by the UAV 44.

The fishing lines 20 extend along the UAV tether line 36 at equal intervals, but the spacing can vary depending on the type of bait setup used. Some bait systems may function closer to each other than others. Also, the depth and currents may influence the spacing that is optimal.

Each fishing line 20 is clasped in a fixed position along the length of the UAV tether line with a clasp 40. Each clasp 40 individually releases when an associated fishing line 20 is hit and bait attached to the fishing line 20 is taken by a fish, or hit by a snag. Typically, the vessel 12 has a forward trajectory so there is a probability that the bait of any hit line may end up behind the vessel 12, thus the other fishing lines attached to either the tether 36 or the tether 38 will not likely tangle. Under optimal circumstances the drones 42 and 44 can remain in a fixed position relative to the vessel 12, and the fishing lines 20 attached to the respective tether lines 36 and 38 can also remain in operation because the more time the bait is in the water, the more likely fishing success will achieved. In another embodiment, the drones 42 and 44 remain fixed as the water and vessel 12 shift. In either case the tether line is ideally maintained with a relatively constant tension.

One benefit of the extended outrigger-style fishing in accord with the present invention, is that more lateral area, and depths, can be covered by vessel 12 and fishing lines 20. Another benefit is that lines 20 may stay operational even when one or more of the lines has been hit by a fish and is reeling. Yet another benefit is that each line 20 can be individually adjusted to a precise depth, depending on surface features of the bottom of the water body, currents, or movement of fish, for example. A further benefit is that multiple fishing lines, many more than six as shown, can be used in accordance with the present invention.

Figure 5:
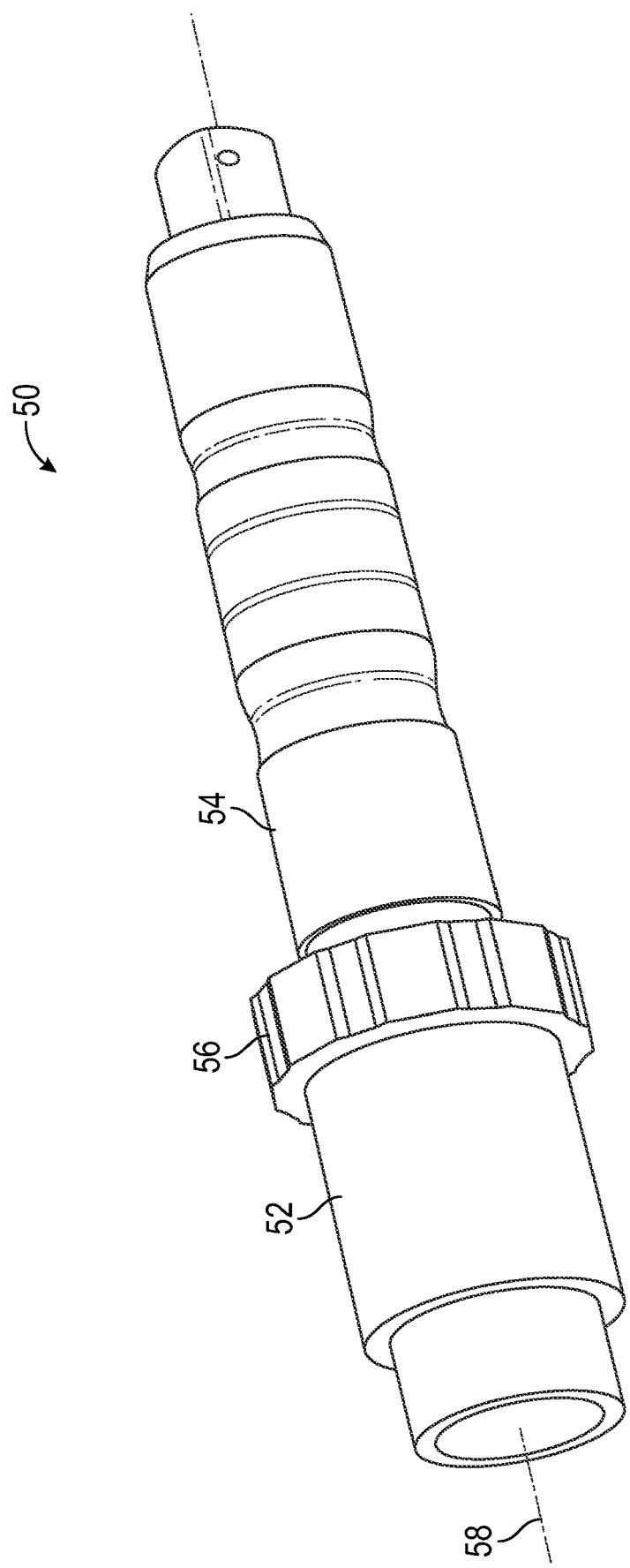
FIG. 5 is a perspective view of a load cell having a bi-axial configuration for attachment to each drone and a tether line to sense tension.

FIG. 5 is a perspective view of a load cell 50. The load cell 50 is a bi-axial load cell presented by way of example. It can be appreciated that any load cell 50 can attach between the UAV and the fishing vessel via the UAV tether in accordance with the present invention. Preferably the load cell 50 attached directly to the UAV to measure tension in the UAV tether and help manage the position of the UAV by sharing tension data with the UAV and the vessel via the UAV tether, or via wireless means.

The load cell includes a male tube 54 and a female tube 52 interconnected by the threaded connector 56 and aligned along an axis 58. The tube configurations enable a UAV tether to thread through the load cell 50 along the axis 58 in a press fit manner.

The computing module of the UAV can be a general purpose computer programmed with software and firmware. The computing module including random memory, solid state storage, a processor and data base connecting these elements. The computing module can also be located on the landing pad, or another place on the vessel.

We claim:

1. A drone fishing system mountable on a fishing vessel, the system comprising:
a landing pad mounted on the fishing vessel;
an unmanned aerial vehicle (UAV);

a tether line and tether reel mounted on the fishing vessel of the fishing vessel for maintaining an electrical connection between the fishing vessel and the UAV;

the UAV including a computing module for determining optimal positioning of the UAV with respect to the fishing vessel during operation;

the tether line having an abrasion resistant cable jacket for enabling a selective engagement of a clip on the tether line;

a first altimeter mounted on the fishing vessel and a second altimeter mounted on the UAV, the altimeters communicate with the computing module of the UAV to maintain the UAV in operation and to enable the UAV to take off and land on the landing pad; and the tether line communicates power and data between the landing pad and the UAV.

2. The drone fishing system as set forth in claim 1, wherein the cable jacket is a fluoropolymer fiber material to optimize abrasion resistance.

3. The drone fishing system as set forth in claim 1, wherein the cable jacket encloses 100 ohm copper quadrax cables capable of communicating data, and DC current between the UAV and the fishing vessel via the landing pad at 24 volts.

4. The drone fishing system as set forth in claim 1, wherein the fishing vessel defines starboard and port sides, the system further comprises two landing pads, one landing pad being mounted on each of the the starboard and port sides, respectively, to enable two UAV's to operate simultaneously.

5. The drone fishing system as set forth in claim 4 further comprising fishing poles mounted on the starboard and port sides of the fishing vessel.

6. The drone fishing system as set forth in claim 5 further comprising fishing lines extending from the fishing poles to the tether line, and being slideably connected thereto.

7. The drone fishing system as set forth in claim 6, further comprising a clip selectively affixed on each UAV tether line for holding for a fishing line.

8. The drone fishing system as set forth in claim 7, further comprising three clips selectively affixed on each UAV tether line, each for holding for a single fishing line.

9. The drone fishing system as set forth in claim 6, further comprising three clips selectively affixed on each UAV tether line, each for holding for a single fishing line, the fishing lines each include a baited hook, the clips being configured to release the single fishing line in response to tension, such as applied when a fish hits the baited hook.

10. The drone fishing system as set forth in claim 9, wherein the UAV is programmed to maintain a constant bait speed relative to flowing water.

11. The drone fishing system as set forth in claim 9, wherein the UAV is programmed to vary bait speed relative to flowing water.

12. The drone fishing system as set forth in claim 9, wherein when the baited hook is hit by a fish, the clip releases the fishing line, and the UAV re-positions to avoid entanglement of the released fishing line with the drone tether, or any other fishing lines supported by the UAV.

13. The drone fishing system as set forth in claim 1, further comprising a load cell interconnecting each tether line and each UAV for measuring tension in the tether line and communicating the measured tension to the computing module.

14. The drone fishing system as set forth in claim 1, further comprising a load cell interconnecting each tether line and each UAV for measuring tension in the tether line, the load cell electronically communicates with the fishing vessel and with the UAV via the UAV tether line.

15. The drone fishing system as set forth in claim 1, further comprising a load cell interconnecting each tether line and each UAV for measuring tension in the tether line, the load cell having a bi-axial configuration.

16. The drone fishing system as set forth in claim 1, further comprising a load cell interconnecting each tether line and each UAV for measuring tension in the tether line, the load cell having a bi-axial configuration.

17. The drone fishing system as set forth in claim 1, further comprising a tension reel assembly enclosed within the landing pad for maintaining desired tension in the tether line.

18. The drone fishing system as set forth in claim 1, further comprising a tension reel assembly including a tension reel sensor, the tension reel assembly being enclosed within the landing pad for maintaining desired tension in the tether line, the tension reel assembly includes a tension sensor in communication with the load cell of the UAV to enable desired distance of the UAV from the fishing vessel, and to enable automatic deliver of required power to the UAV via the tether line to maintain the UAV at a desired relative altitude above the fishing vessel during operation.

19. The drone fishing system as set forth in claim 18, wherein the first altimeter mounted on an aft portion of the fishing vessel, the first and second altimeters are in communication via the tether line to maintain the UAV at a desired relative altitude above the fishing vessel during operation.

20. The drone fishing system as set forth in claim 19, wherein the fishing vessel includes a speedometer to determine speed relative to flowing water, the speedometer, altimeters, the load cell and the tension reel sensor cooperate to maintain a desired bait depth and velocity when the fishing vessel turns, slows, changes altitude, or when currents change.

* * * * *